US006926639B2

(12) United States Patent
Hopper

(10) Patent No.: US 6,926,639 B2
(45) Date of Patent: Aug. 9, 2005

(54) VEHICLE CONTROL METHOD

(75) Inventor: Mark L. Hopper, Ypsilanti, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/635,304

(22) Filed: Aug. 6, 2003

(65) Prior Publication Data

US 2005/0003930 A1 Jan. 6, 2005

Related U.S. Application Data

(60) Provisional application No. 60/484,467, filed on Jul. 2, 2003.

(51) Int. Cl.[7] .............................................. B60K 41/04
(52) U.S. Cl. ..................................... 477/110; 477/111
(58) Field of Search ........................... 477/3, 107, 110, 477/113, 127, 156

(56) References Cited

U.S. PATENT DOCUMENTS

| 4,454,789 A | 6/1984 | Kaspar et al. |
| 5,272,630 A | 12/1993 | Brown et al. |
| 5,823,282 A | 10/1998 | Yamaguchi |
| 5,941,786 A | 8/1999 | Van Wijk et al. |
| 6,026,921 A | 2/2000 | Aoyama et al. |
| 6,093,974 A | 7/2000 | Tabata et al. |
| 6,169,806 B1 | 1/2001 | Kimura et al. |
| 6,171,211 B1 | 1/2001 | Ortmann et al. |
| 6,176,808 B1 | 1/2001 | Brown et al. |
| 6,217,479 B1 | 4/2001 | Brown et al. |
| 6,258,008 B1 | 7/2001 | Tabata et al. |
| 6,270,443 B1 | 8/2001 | Ito et al. |
| 6,275,759 B1 | 8/2001 | Nakajima et al. |
| 6,390,947 B1 | 5/2002 | Aoki et al. |
| 6,440,041 B1 | 8/2002 | Riedle et al. |
| 6,463,900 B1 | 10/2002 | Wakabayashi et al. |
| 6,556,910 B2 * | 4/2003 | Suzuki et al. .................. 477/8 |
| 6,730,000 B1 * | 5/2004 | Leising et al. .............. 477/110 |
| 6,752,741 B2 * | 6/2004 | Kahlon et al. .................. 477/5 |
| 2002/0074173 A1 | 6/2002 | Morimoto et al. |
| 2003/0004031 A1 | 1/2003 | Philips et al. |
| 2003/0073540 A1 | 4/2003 | Eguchi et al. |

FOREIGN PATENT DOCUMENTS

| DE | 197 42 815 A1 | 4/1998 |
| DE | 199 50 080 A1 | 5/2000 |
| EP | 0 127 085 A2 | 12/1984 |
| EP | 0 766 002 A1 | 4/1997 |
| EP | 1 052 400 A2 | 11/2000 |
| EP | 1 069 311 A1 | 1/2001 |
| EP | 1 069 349 A2 | 1/2001 |

(Continued)

OTHER PUBLICATIONS

U.S. Patent Aplication Publication No. US 2001/0010027 A1, published Jul. 26, 2001, entitled "Hybrid Vehicle Control Device," to Takano et al.

(Continued)

*Primary Examiner*—Roger Pang
(74) *Attorney, Agent, or Firm*—Dickinson Wright PLLC

(57) ABSTRACT

A method of controlling an engine and an automatic transmission of a vehicle to reduce noise, vibration and harshness issues during shutting off a vehicle engine to improve fuel economy. The method combines vehicle engine start/stop control with neutral idle control in the transmission.

16 Claims, 9 Drawing Sheets

FOREIGN PATENT DOCUMENTS

| | | |
|---|---|---|
| EP | 1 077 149 A2 | 2/2001 |
| EP | 1 177 930 A2 | 2/2002 |
| GB | 2 280 721 A | 2/1995 |
| GB | 2 375 803 A | 11/2002 |
| JP | 9-24752 | 1/1997 |
| JP | 10122008 * | 5/1998 |
| JP | 2002-21993 | 1/2002 |
| JP | 2002-274224 | 9/2002 |

OTHER PUBLICATIONS

U.S. Patent Aplication Publication No. US 2001/0024994 A1, published Sep. 27, 2001, entitled "Transmission Unit," to Sugano.

U.S. Patent Aplication Publication No. US 2002/0019691 A1, published Feb. 14, 2002, entitled "Automatic Start Controlling Apparatus Of Internal Combustion Engine And Detecting Engagement Of Clutch," to Matsubara et al.

U.S. Patent Aplication Publication No. US 2002/0074173 A1, published Jun. 20, 2002, entitled "Automatic Stop/Start-Up Controlling Device Of An Engine," to Morimoto et al.

U.S. Patent Aplication Publication No. US 2002/000193930 A1, published Dec. 19, 2002, entitled "Automatic Engine Stop/Restart-Type Vehicle, Method of Controlling The Same, And Automatic Engine Stop Apparatus," to Matsubara et al.

U.S. Patent Aplication Publication No. US 2003/0022757 A1, published Jan. 30, 2002, entitled "Engine Restart Starting Control System For Transmission," to Shimabukuro et al.

U.S. Patent Aplication Publication No. US 2003/0045988 A1, published Mar. 6, 2002, entitled "Control Apparatus And Method For Vehicle Having An Idle Stop Function," to Suzuki et al.

Copy of patent application (20 pages) and drawing (4 pages) for U.S. Appl. No. 10/386,629, filed Mar. 12, 2003, entitled "A System And Method For Regulating Pressure In An Automatic Transmission," to Hopper.

Combined Search and Examination Report dated Oct. 22, 2004 for GB 0413645.3 (4 pages).

Two Further Search Reports Under Section 17 for Gt. Britain Application No. GB 0413645.3 dated Jan. 28, 2005 (2 pages).

* cited by examiner

VEHICLE CONTROL METHOD

CROSS-REFERENCE TO RELATED APPLICATION

This application claims the benefit of U.S. Provisional Application No. 60/484,467, filed Jul. 2, 2003, the entire disclosure of this application being considered part of the disclosure of this application and hereby incorporated by reference.

BACKGROUND OF THE INVENTION

The present invention relates to a method for controlling an engine and an automatic transmission of a vehicle and, more particularly, to a control method for engines and automatic transmissions that combines neutral idle control in the transmission with engine stop/start control.

To improve fuel economy, manufacturers have proposed shutting off a vehicle's engine while the vehicle is at rest, such as the vehicle being at rest at a stop light. Currently, if a control system shuts off the engine when the vehicle comes to a rest, the operator and occupants may experience noise, vibration, and harshness issues. These noise, vibration, and harshness issues are from abruptly ending the forward output torque (T') of the vehicle's engine applied through the automatic transmission to the vehicle's wheels. Similar problems may also occur as the engine of the vehicle is restarted and the output torque (T') is suddenly applied to the wheels. Another problem with using engine start/stop control strategies is that when the engine restarts in response to an engine start condition, such as the operator pressing the throttle pedal upon seeing a green light, the transmission may require time to build enough pressure (P') against an actuator that controls the engagement state of an engagement element that transfers torque from the engine to the wheels. The delay in building pressure (P') to engage the engagement element delays the forward motion of the vehicle, which is undesirable and presents safety concerns.

To address some of these problems, manufacturers have introduced a variety of methods to reduce the pressure in a transmission before stopping the engine. One such method requires the operator of the vehicle to shift the transmission into neutral, thereby releasing pressure (P) against the engagement device before the engine is shut off. Upon sensing that the gear selection is neutral, the control system stops the engine. To many consumers, the additional step of manually selecting neutral to improve fuel economy is unacceptable. This method is also subjected to delay associated with the building of pressure before the vehicle can accelerate after the operator moves the shift lever to drive.

To improve fuel economy, other manufacturers have used neutral idle control algorithms. Neutral idle control is used to reduce pressure in the transmission to disengage the torque transfer between the engine and the wheels when the vehicle comes to a stop, thereby saving fuel economy while the engine is running. Fuel economy is improved in neutral idle transmissions because the engine does not have the drag associated with providing forward torque, while the vehicle is stopped. Neutral idle control methods have not been used with stop/start engine control methods due to problems with this combination that include loss of pressure if the engine is stopped, and delay in building pressure after the engine is restarted. The output torque (T'), combustion torque (C'), and actuator pressure (P') of an exemplary prior art transmission are represented in FIGS. 5–10.

SUMMARY OF THE INVENTION

The present invention is directed to a method of controlling an engine and an automatic transmission in a vehicle, the automatic transmission having an engagement element and an actuator disposed between a torque input and a torque output, the engagement element operative in engagement states to selectively transfer torque from the torque input to the torque output and wherein the actuator applies a pressure to the engagement element to control the engagement state of the engagement element, the method comprising: sensing a vehicle stop condition; reducing the pressure applied by the actuator to the engagement element to a neutral idle pressure in response to the vehicle stop condition; sensing the neutral idle pressure; and stopping the vehicle engine after sensing the neutral idle pressure. The method may further include sensing a vehicle start condition and starting the engine in response to said vehicle start condition, increasing the pressure applied to the engagement element while starting the engine in response to the vehicle start condition, and increasing the pressure applied to the engagement element as a function of engine throttle after the engine is started. The method may further allow starting and stopping of the engine in response to engine start and engine stop conditions while maintaining the neutral idle pressure.

The present invention is also directed to a method of controlling an engine and an automatic transmission in a vehicle, the automatic transmission having an engagement element and an actuator disposed between a torque input and a torque output, the engagement element operative in engagement states to selectively transfer torque from the torque input to the torque output and wherein the actuator applies a pressure to the engagement element to control the engagement state of the engagement element, said method comprising: stopping the engine while the engagement element is in a disengaged state, sensing an engine start condition after stopping the engine, starting the engine in response to the engine start condition while maintaining the engagement element in the disengaged state, and maintaining the engagement element in the disengaged state while the engine is running. The method may further include sensing a vehicle stop condition, placing the engagement element in the disengaged state in response to the vehicle stop condition, and sensing when the engagement element enters a disengaged state before stopping the engine while the engagement element is in the disengaged state.

The present invention is also directed to a method of controlling an engine and an automatic transmission in a vehicle, the automatic transmission having an engagement element and an actuator disposed between a torque input and a torque output, the engagement element operative in engagement states to selectively transfer torque from the torque input to the torque output and wherein the actuator applies a pressure to the engagement element to control the engagement state of the engagement element, said method comprising: sensing a vehicle start condition; starting the engine in response to the vehicle start condition; increasing the pressure applied to the engagement element while starting the engine in response to the vehicle start condition.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 11:
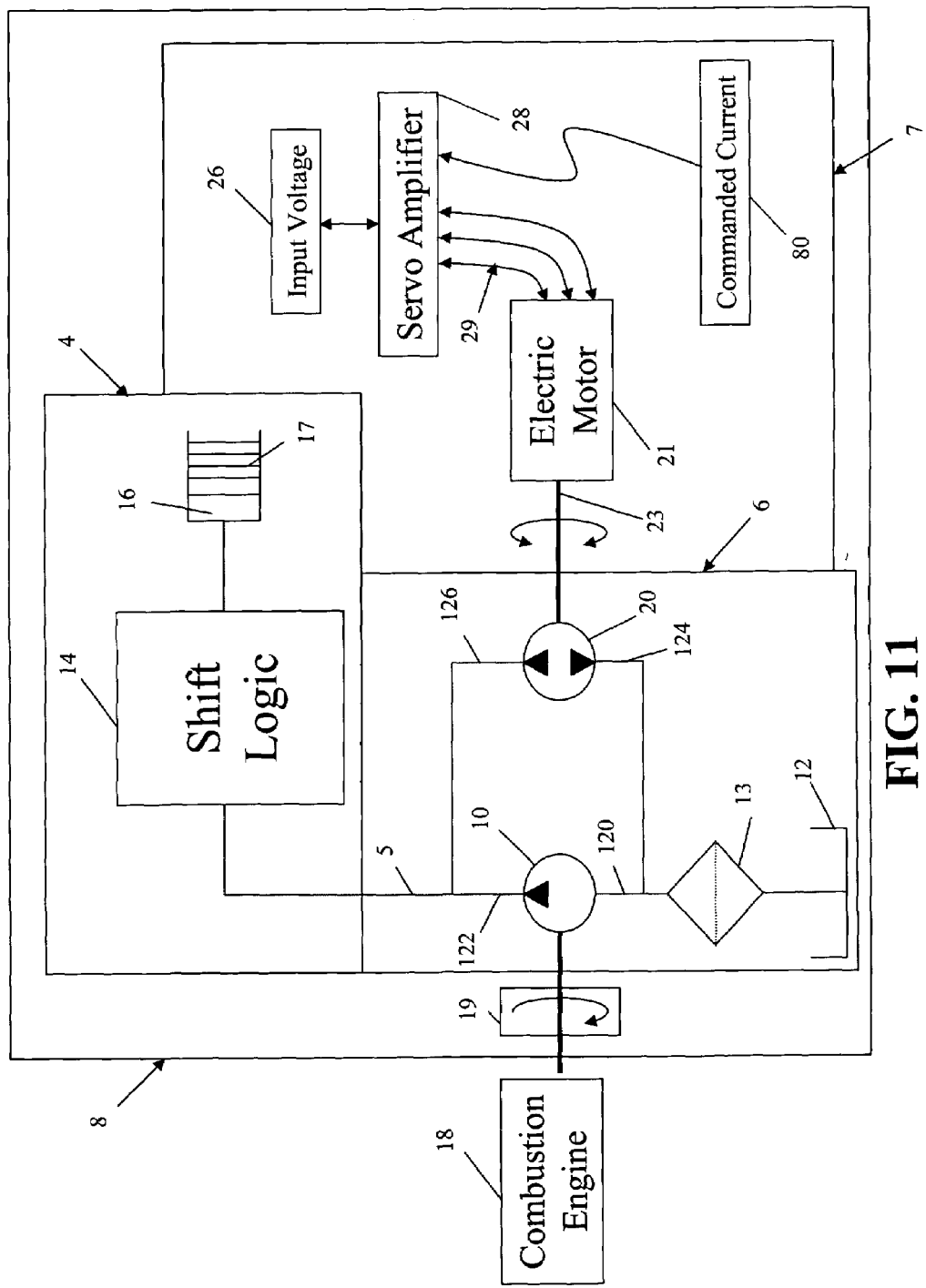
FIG. 11 is a schematic showing a second exemplary transmission.

The present invention is generally directed to a method for controlling fluid pressure communicated to an engagement element of an automatic transmission such as a transmission clutch assembly in conjunction with controlling the operating state of the engine. With reference to the drawings, a vehicle (not shown) includes a power source, such as the illustrated combustion engine 18, drivably coupled to a transmission 8 (FIG. 11). The transmission 8 includes a hydraulic system 6 for applying fluid to a transmission actuating assembly 4. The transmission actuating assembly 4 includes an actuator 16 and a conventional shift logic 14. The shift logic 14 receives fluid from an outlet 5 of the hydraulic system 6 and directs the fluid to the proper actuator 16, creating an actuating pressure (P') against the actuator in a manner generally known in the art. The actuator 16 forces an engagement element 17 into an engaged state so that the transmission 8 may transfer input torque from the engine 18 to the drive wheels (not shown). A control system (not shown) such as an engine management system controls the pressure in the transmission 8. A turbine 19 is situated between the engine and transmission as is well known in the art.

When the vehicle approaches a stop or comes to a stop, the control system may determine a vehicle stop condition is met (Step 102). The hydraulic system 6 then releases hydraulic fluid to reduce the hydraulic pressure (Step 104) against the actuator 16. The hydraulic fluid is generally released until the control system determines that the pressure applied by the actuator 16 to the engagement device 17 is approximately equal to or less than a neutral idle pressure associated with a neutral idle state (Step 106). The neutral idle state generally occurs when the engagement element 17 enters a disengaged state, but the pressure supplied to the actuator is greater than zero. By keeping pressure against the actuator 16, the engagement device enters the engaged state with minimal delay. More specifically, in a neutral idle state the engagement element 17 does not transfer torque, but is receiving a neutral idle pressure from the actuator 16 so that, when desirable, the engagement element 17 may enter an engaged state quicker than if the neutral idle pressure was not maintained. Once the transmission is in the neutral idle state, a variety of control options are available, depending on current vehicle or engine conditions received by the control system. For example, after reaching neutral idle pressure, the engine may be stopped (Step 110) unless a control condition prevents the engine from stopping. When the engine stop condition is no longer met, such as when the control system determines that a vehicle start condition (Step 116) has been met, the engine is cranked to start the engine while the pressure against the actuator 16 is increased independent of throttle (Step 118). With the engine started, the pressure is increased as a function of throttle (Step 120). When the pressure against the engagement device 17 reaches a certain level, the engagement device is in an engaged state allowing the vehicle to drive away. More exemplary vehicle control strategies will be described in greater detail below.

The transmission 8 may be formed and assembled in a variety of configurations capable of performing the control strategy of the present invention. Exemplary embodiments include, but are not limited to, transmissions shown in FIG. 11 which are described in greater detail below. In general, the hydraulic system 6 should be capable of building pressure against the engagement device 17 to allow increasing of the pressure while the engine 18 is being started. Increasing pressure independent of throttle while the engine 18 is started, allows pressure to build in a manner that eliminates noise, vibration, and harshness issues and significantly reduces delay in the engagement device 17 entering the engaged state. The pressure device may be any device capable of maintaining the pressure while the engine is not running, such as a separate pressurized fluid supply, a pump driven by the engine with an accumulator system to maintain pressure with the engine off or, as illustrated in FIG. 11 a secondary pump driven 20 by an electric motor 21.

Figure 12:
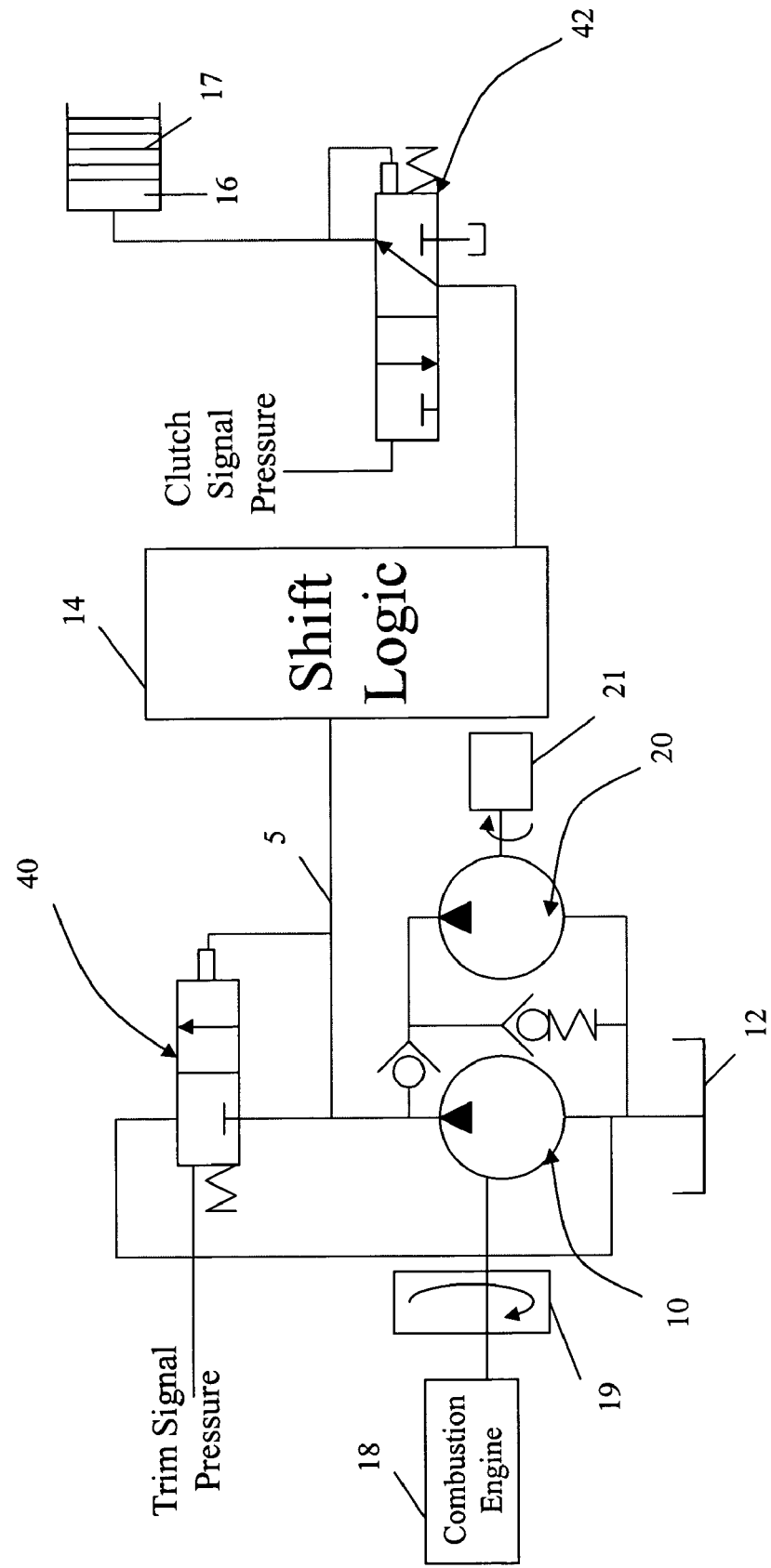
FIG. 12 is a schematic showing a first exemplary transmission.

The transmission 8 illustrated in FIG. 12 generally includes a pump 10 driven by the engine 18 and spool valves 40 which bypass hydraulic fluid provided by the pumps 10 and 20 when the pressure exceeds a specified bypass pressure. Pressure is provided through an outlet conduit 5 to a shift logic 14 which routes the pressure to the proper actuator 16. Between the shift logic 14 and actuator 16 a neutral idle pressure regulation valve 42 is placed to selectively isolate the actuator from pressure provided by the hydraulic system 6. Therefore, neutral idle may be achieved while the pump 10 is being driven by the engine 18. This allows pressure control of the actuator 16 independent of the operating state of the engine, such as while the engine is stopped and running. The secondary pump 20 may further control the pressure by providing an increase in pressure while the vehicle engine 18 is started, before the pump 10 driven by the engine 18 provides pressure. The secondary pump 20 also is capable of maintaining the pressure when the engine 18 is stopped and, therefore, the primary pump is not providing hydraulic fluid to create a pressure.

The transmission 8' illustrated in FIG. 11 is described in greater detail in related patent application Ser. No. 10/386,629, filed Mar. 12, 2003, entitled "A System And Method For Regulating Pressure In An Automatic Transmission." In general, the transmission 8 illustrated in FIG. 11 includes a hydraulic system 6 applying fluid to an actuating assembly 4. More specifically, fluid is drawn from a sump 12 through a filter 13 provided to an outlet conduit 5 by a primary pump 10 driven by the combustion engine 18 and a secondary pump 20 driven by an electric motor 21. By controlling the torque on the electric motor 21 the pressure may be increased or decreased as needed. The secondary pump 20 is also capable of controlling the pressure as needed when the engine 18 is stopped.

Other exemplary transmissions that accomplish the invention may include using a single electric pump, a single electric pump plus a solenoid, two electric pumps, or any other transmission that is capable of increasing pressure against the engagement device independent of the operating state of the engine.

The control method will now be described in greater detail. The control method is particularly well suited for hybrid vehicles which stop and start the internal combustion engine as needed to increase fuel economy. The control method may also have broader applicability to vehicles with traditional combustion engines to improve fuel economy. The control method will be described below in greater detail with reference to use in a hybrid vehicle, although it should be understood that this is used as a non-limiting example. The output torque (T), combustion torque (C), and actuating pressure (P) of an exemplary transmission incorporating the method of the present invention may be seen in FIGS. 5–10.

Under normal driving conditions the engagement element 17 is typically in an engaged state (Step 100). When the engine 18 is not in demand, such as when the vehicle is coasting, coming to a stop, or stopped, the control system may determine or sense a vehicle stop condition (Step 102). A vehicle stop condition may be determined by any condition where it is desirable to reduce the pressure applied to the engagement element 17 to allow the transmission to enter a neutral idle state. Even though the term "vehicle stop condition" is used, the criteria to satisfy the vehicle stop condition may be much broader including coasting, deceleration or any other condition where it is desirable to enter a neutral idle state and/or turn off the vehicle engine to improve fuel economy.

Upon sensing a vehicle stop condition (Step 102) the control system may reduce pressure in the actuator 16 (Step 104) such as by releasing hydraulic pressure. While the pressure may be reduced by a variety of methods, the reduction of hydraulic pressure is generally well known in the art and associated with transmissions capable of neutral idle. A modified neutral idle transmission for use in the present invention may be seen in FIG. 12. To reduce the pressure in the transmission 8', as illustrated in FIG. 12, the pressure is reduced with the use of a pressure regulation valve 17 which balances the actuator pressure against the output pressure of an electro-hydraulic solenoid. Another exemplary method of reducing pressure in the actuator 16 is illustrated in FIG. 11 and includes controlling the torque supplied by an electric motor 21 driving a secondary pump 20 so that the pressure supplied to the actuator 16 may be reduced even though the primary pump 10, driven by the engine 18, is supplying hydraulic fluid to create a pressure. This method of pressure control is described in greater detail in U.S. application Ser. No. 10/386,629, filed on Mar. 12, 2003, and entitled "A System And Method For Regulating Pressure In An Automatic Transmission."

Figure 6:
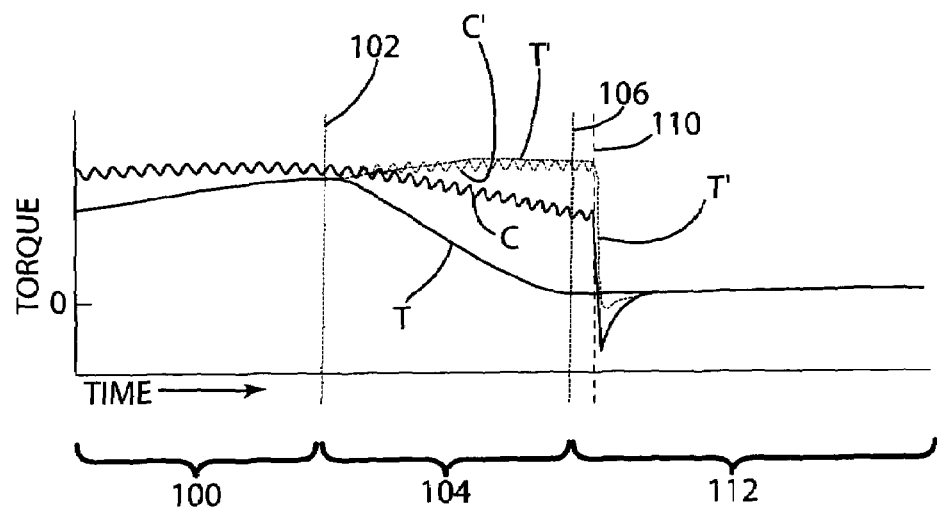
FIG. 6 is a graph showing torque over time in response to a vehicle stop condition.

In general, it is desirable to gradually decrease the pressure against the actuator 16 until the engagement element 17 reaches a neutral idle state. The neutral idle pressure generally associated with a neutral idle state is a pressure wherein the engagement element 17 is disengaged so that torque is not transferred between the engine 18 and the wheels, but enough pressure is still applied by the actuator to keep the engagement device ready for engagement. More specifically, the pressure is released not to zero, but to a pressure that is somewhat close to the pressure at which the engagement element 17 becomes engaged to transfer torque. This neutral idle pressure may also be a range approximately between no pressure and the pressure applied to the actuator 16 where the engagement element 17 becomes engaged. By gradually reducing the pressure, to a neutral idle pressure, noise, vibration, and harshness issues are significantly reduced when the engine is stopped, as compared to systems where the engagement element is in an engaged state. A graph showing the pressure over time in response to a vehicle stop condition may be seen in FIG. 6. In FIG. 6, the solid line represents the transmission pressure using the current control method, while the dotted line represents the prior art transmission pressure in a typical transmission wherein the engine is stopped (Step 110) while the engagement element is engaged. In FIG. 6, the combustion torque input into the transmission 8 as well as the output torque in response to the vehicle stop condition illustrated in FIG. 5, may be seen. While the transmission is in the engaged state (Step 100), the output torque is approximately equal to combustion or input torque. As illustrated by the solid line in FIG. 6, the pressure is released in response to a vehicle stop condition, the output torque is reduced to approximately zero before the engine 18 is stopped (Step 110). In comparison, the output torque is abruptly stopped in the prior art, as illustrated by the dotted line in FIG. 6, in response to the vehicle stop condition 110.

The control system determines when the pressure reaches a neutral idle pressure associated with a neutral idle state (Step 106). The neutral idle pressure may be measured by the hydraulic pressure in the actuator 16, the position of the actuator, or the engagement state of the engagement element 17. Upon sensing that a neutral idle pressure has been reached (Step 107), the control system generally stops reducing pressure and maintains the pressure (Step 108), typically within a neutral idle pressure range. By maintaining the hydraulic pressure in a neutral idle pressure range, the engagement element 17 is generally ready to be engaged more quickly than if the pressure was reduced to zero. This maintenance of pressure (Step 108) eliminates most of the delay during the initial building of pressure against the engagement device 16. It should be readily understood that once the pressure starts to be released (Step 104), the pressure may be increased at any time such as when the vehicle stop condition is no longer met. An example of this would be a vehicle decelerating so that a vehicle stop condition is met, but before the transmission is in a neutral idle state, the operator presses the throttle so that the vehicle stop condition is no longer met, which causes the pressure to be increased as a function throttle (Step 120) so that the engagement element 17 is in an engaged state (Step 100) to transfer torque between the engine 18 and the wheels.

Figure 1:
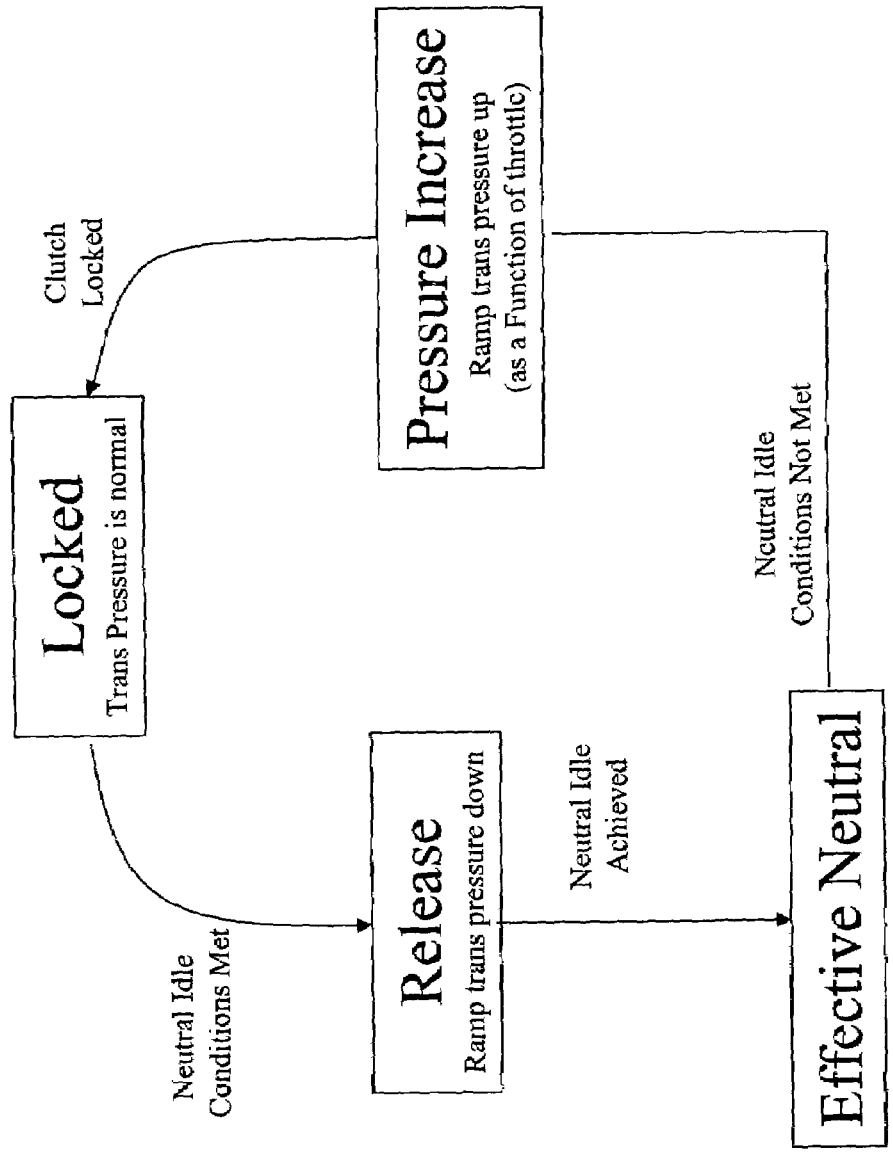
FIG. 1 is a diagram of a prior art neutral idle control method.
Figure 2:
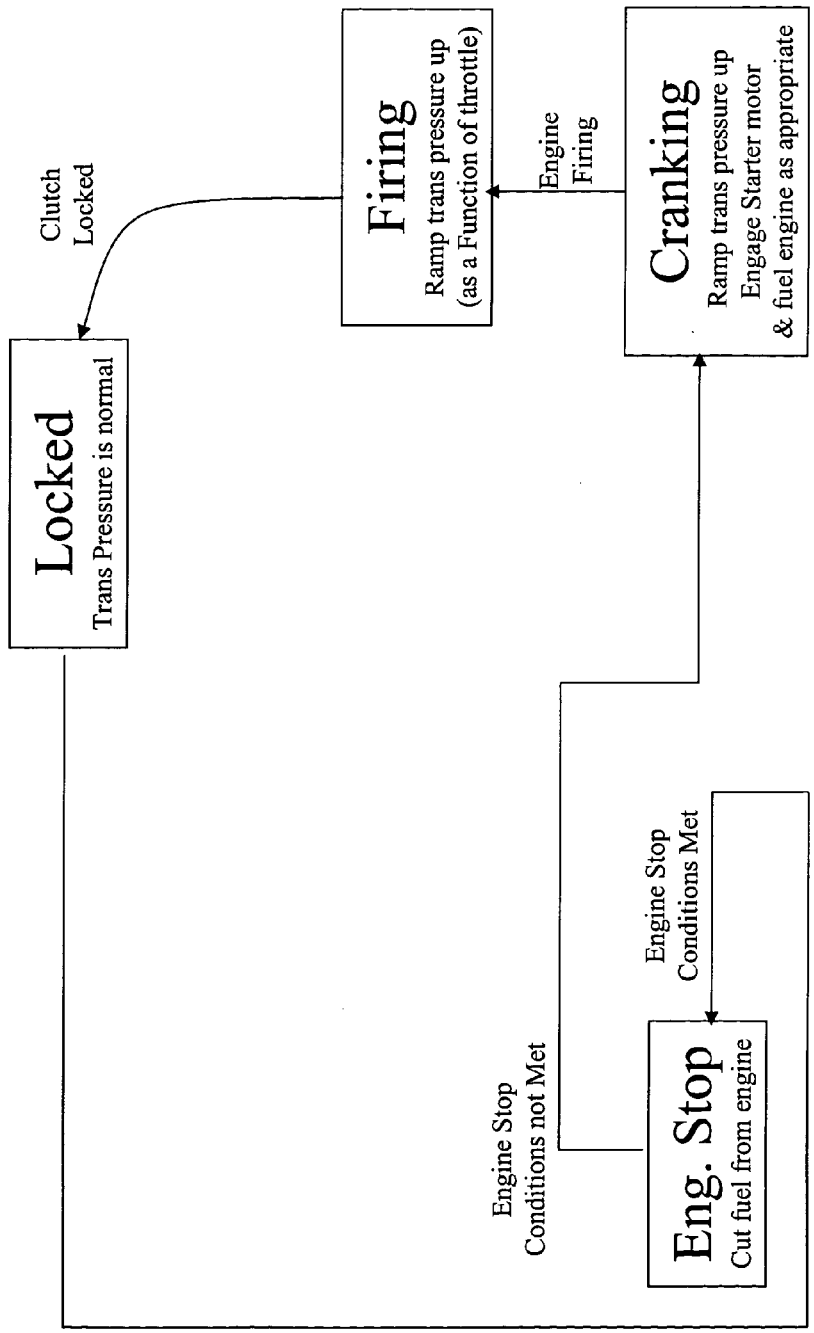
FIG. 2 is a diagram of a prior art stop and start control method.
Figure 3:
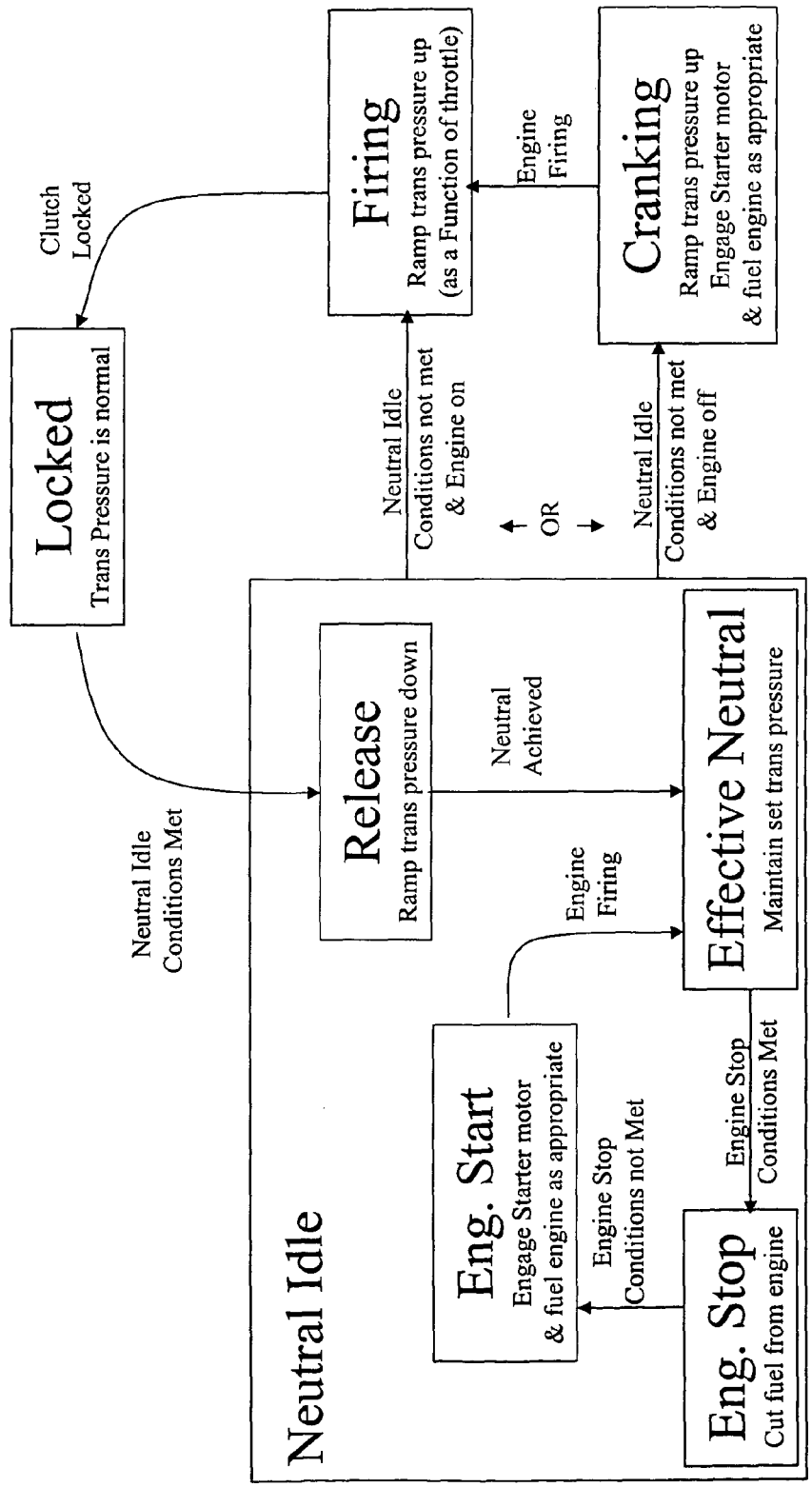
FIG. 3 is a diagram of the present invention control method.
Figure 4:
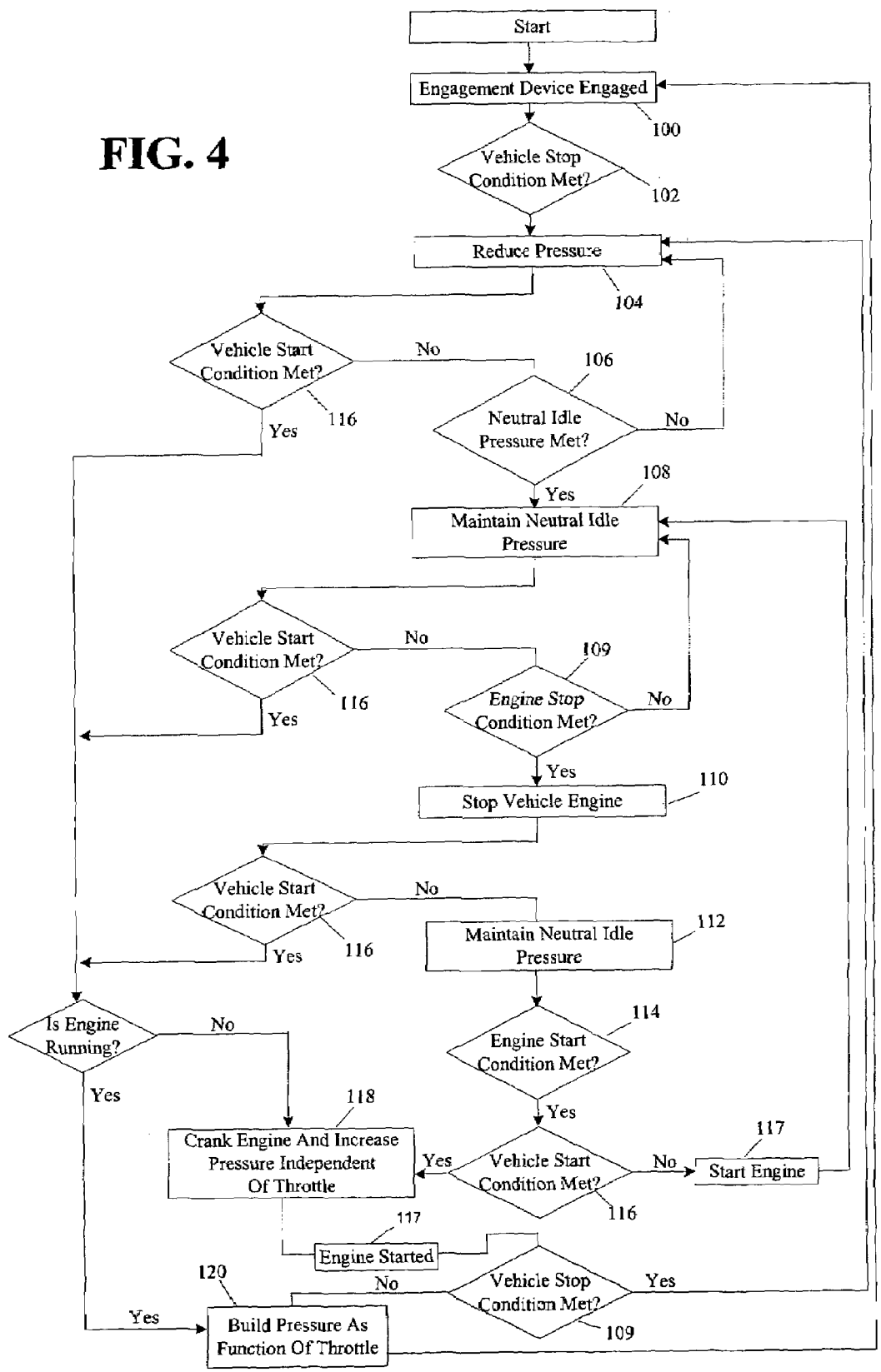
FIG. 4 is a flow chart detailing the control steps of the present invention.
Figure 5:
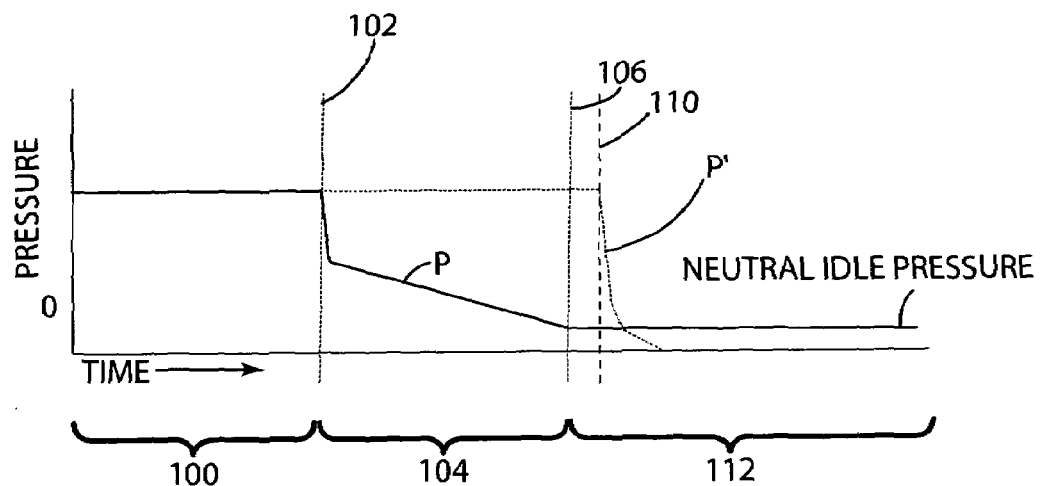
FIG. 5 is a graph showing transmission pressure over time in response to a vehicle stop condition.

If a vehicle stop condition is met upon reaching a neutral idle pressure, the transmission 8 is in a neutral idle state, no longer transferring torque due to the engagement element 17 being in a disengaged state. While the transmission is in a neutral idle state, a variety of further conditions may create different control strategies (FIG. 4). For example, while the transmission is in the neutral idle state, fuel economy is improved and the transmission may maintain the neutral idle state until it is desired for the vehicle to accelerate. The remaining portions of the control strategy will be described in view of FIG. 4. Even though the various control conditions such as vehicle stop condition, vehicle start condition, engine stop condition, and engine start condition are described as being between various steps or being steps themselves, it should be readily recognized that the control system may receive any one of these conditions at any time and then control the vehicle in accordance with that control condition.

Once the neutral idle pressure it met, the control system generally maintains that pressure (Step 108). With the engine still running, if the control system determines that a vehicle start condition is met (Step 116), the control system may increase pressure as a function of throttle (Step 120) until the engagement element 17 is in an engaged state (Step 100). If the control system instead determines that an engine stop position is met (Step 109), while the transmission is in a neutral idle state, the control system may stop the vehicle engine (Step 110). For example, the control system may stop the vehicle engine when it determines the vehicle may be stopped for a particular period of time and that it would be more fuel efficient to turn off the engine. In determining the engine stop condition, the control system may check for any items or conditions that require the engine to be running. For example, if the compressor for the air conditioning is currently running, the control system may keep the engine running until the compressor is turned off. In some embodiments, if maximum air conditioning is being used so that the compressor is cycled frequently off and on, the control system may prevent the engine 18 from stopping to prevent excessive wear on the starter, or to prevent the occupants from feeling the engine cycle on and off frequently. Other exemplary systems that the control system may check before executing an engine stop condition include brake boost, catalytic converter temperature, or air conditioning compressor state. Due to the power assist of brakes in modern vehicles and power steering, even though the transmission 8 may generally be in a neutral idle condition as the vehicle is approaching a stop, the control system may prevent the engine 18 from stopping until the vehicle comes to a complete stop, thereby ensuring that the operator will have the expected braking power and steering response.

If the control system determines that the engine stop conditions are met (Step 109), the control system will stop the vehicle engine (Step 110). Because the pressure in the actuator 16 has already been reduced to a neutral idle pressure, noise, vibration, and harshness issues are generally eliminated or significantly reduced as the vehicle engine is stopped. While the engine 18 is stopped, the control system may be constantly checking for either a vehicle start condition (Step 116) or an engine start condition (Step 114). Further, while the vehicle is stopped, the control system maintains within the hydraulic system 6, and/or against the actuator 16, the neutral idle pressure to keep the engagement element 17 ready for engagement. In some transmissions, such as illustrated in FIG. 12, the neutral pressure regulation valve 42 may isolate the actuator 16 so that minimal pressure is applied to the engagement device while the hydraulic system 6 maintains the necessary pressure against the neutral idle pressure regulation valve so that as the valve opens, the engagement element 17 is quickly changed to an engaged state.

Figure 9:
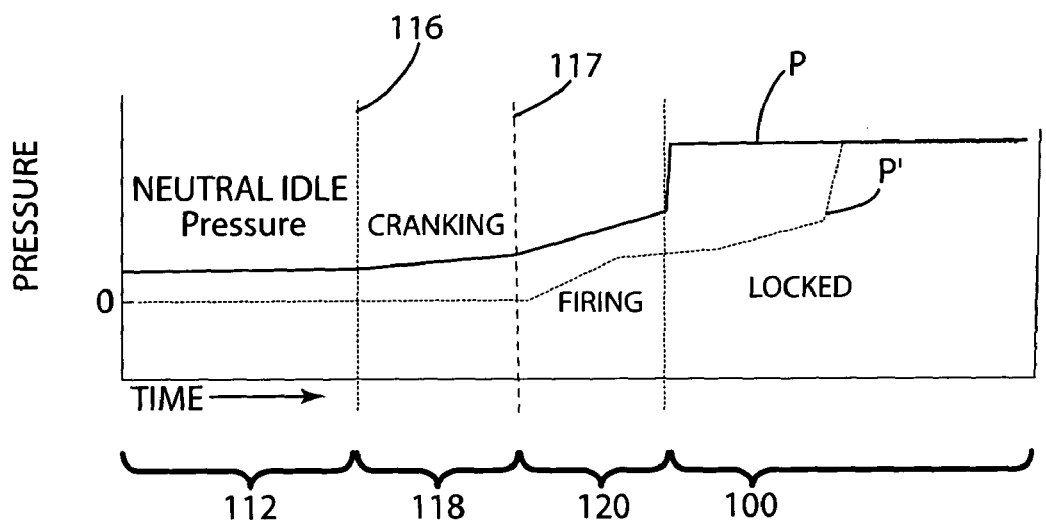
FIG. 9 is a graph of the transmission pressure over time in response to a vehicle start condition.
Figure 10:
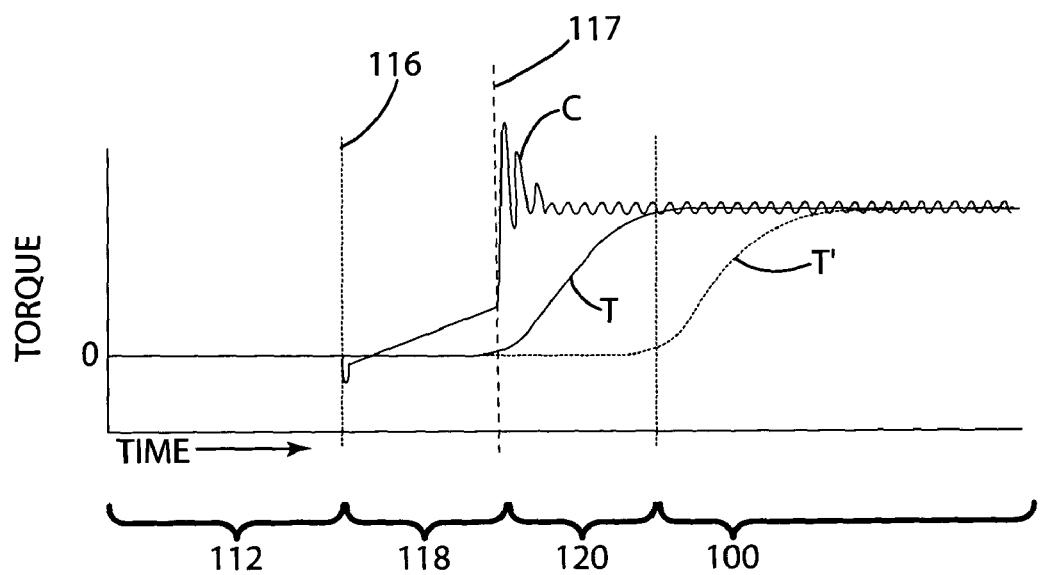
FIG. 10 is a graph of the torque over time in response to the vehicle start condition.

If the control system determines that a vehicle start condition is met (Step 116), the control system may check if the engine 18 is running (Step 119). Continuing with the example where the vehicle engine 18 is stopped, the engine must be started before the vehicle can accelerate. When starting the engine 18, such as by cranking the engine, the pressure is generally increased independent of the throttle (Step 118). Therefore, while the engine is being started, the pressure is increased in the hydraulic system 6 and/or against the actuator 16 so that the engagement element 17 enters a pre-engagement state. In the illustrated embodiment, the engagement element 17 generally only becomes engaged to transfer torque once the engine begins firing, but because the pressure is gradually built during engine cranking, the engagement device engages faster so that the engagement device 16 may transfer torque from the engine 18 to the vehicle wheels more quickly than if the pressure was increased only after the vehicle engine is running as in a traditional transmission. Generally, the engagement element enters a pre-engagement state while the engine is being started. The pre-engagement state generally occurs near the top of the neutral idle pressure range or even more specifically, at approximately the pressure where the engagement element 17 starts to transfer torque and therefore starts to enter the engaged state. If the engagement element 17 reaches the pre-engagement state before the engine is running, the system stops increasing pressure and will hold the pressure associated with the pre-engagement state until the engine is running to prevent any noise, vibration, or harshness issues with the engine starting to fire while the engagement element 17 is in an engaged state. Once the engine is running, the pressure is generally increased as a function of throttle (Step 120). This increase in pressure as a function of throttle is performed similar to most neutral idle control systems. The increase in pressure as a function of throttle also helps engage the transmission faster when needed. For example, if the operator of the vehicle aggressively steps on the accelerator, the throttle will be opened wide on the engine 18 and the control system will quickly increase pressure so that the vehicle may quickly accelerate away from a stopped condition. If the user presses the accelerator more gradually, the control system will also more gradually increase the pressure. Therefore, building of pressure in the hydraulic system and the rate of engagement of the engagement device 16 is a function of throttle but generally independent of engine speed. The increase in pressure being related to the throttle but independent of engine speed helps eliminate noise, vibration, and harshness issues felt by the occupants of the vehicle as it accelerates away from a stop. If the engine is started and is running before the engagement element reaches the pre-engagement state, the pressure may then be increased as a function of throttle to minimize any delay in reaching the engagement state. The above control method in response to a vehicle start condition is further illustrated in FIGS. 9 and 10. FIG. 9 illustrates the transmission pressure over time in response to a vehicle start condition (Step 116) when the engine 18 is not running. The solid line represents the transmission pressure using the above control method, starting at a neutral pressure, increasing slightly while cranking the engine and then increasing as a function of throttle after the engine is started (Step 117). The delay typical in a prior art transmission, due to the delay in building pressure, is illustrated by the dotted line in FIG. 9. FIG. 10 illustrates the output torque and combustion torque in response to a vehicle start condition (Step 116) while the engine 18 is not running. As illustrated in FIG. 10, the output torque is initially zero, but starts to increase approximately the time the engine is started. Therefore, torque is transferred almost immediately upon the engine firing as pressure is built as a function of throttle. The output torque of a prior art transmission is shown by the dotted line in FIG. 10, illustrating the delay.

Figure 7:
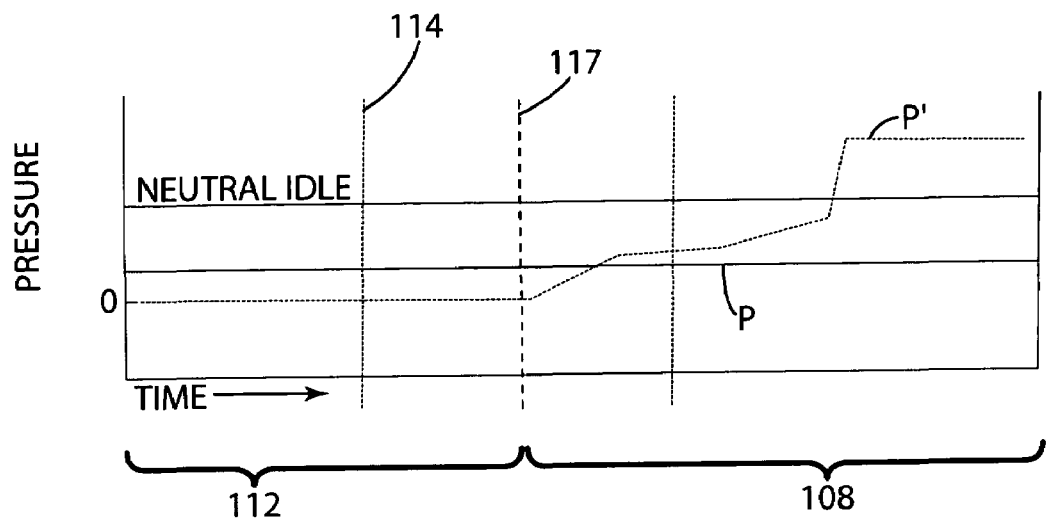
FIG. 7 is a graph showing transmission pressure over time in response to an engine start condition.
Figure 8:
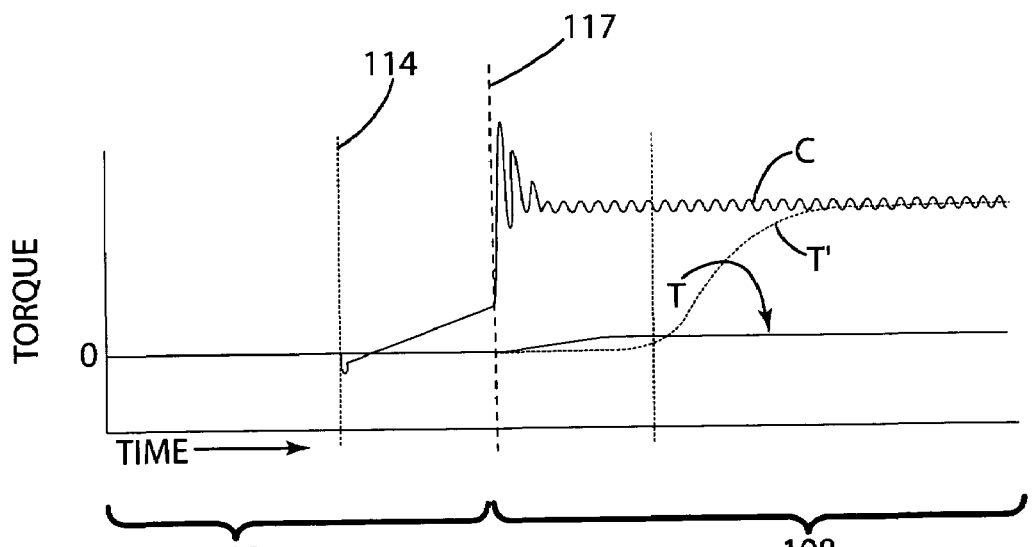
FIG. 8 is a graph showing torque over time in response to an engine start condition.

While the engine is stopped ate Step 110, as described above, the control system may determine that a vehicle start condition is not met (Step 116) but that an engine start condition is met (Step 114). Engine start conditions generally occur when an accessory or vehicle components require engine power to operate. Examples of such components include A/C compressors, brake boost, alternator, or any other system powered by the engine. If the control system determines that an engine start condition is met (Step 114) but a vehicle start condition is not met (Step 116) the control system will start the engine (Step 117) while maintaining the neutral idle pressure (Step 108). Therefore, the engine may be started and stopped as needed without transferring torque due to the engagement element 17 being in a disengaged position. Once the engine 18 is started, the neutral idle pressure is maintained and as seen in FIG. 4, the control loop may repeat. The transmission pressure and output torque in response to an engine start condition are illustrated in FIGS. 7 and 8. As illustrated in FIG. 7, the pressure is maintained, wherein in comparison the pressure in a prior art transmission, as illustrated by the dotted line, would increase once the engine was started (Step 117). As further shown in FIG. 8, the transmission doesn't transfer torque with the engine being started in response to an engine start condition as compared to the prior art, represented by the dotted line.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of controlling an engine and an automatic transmission in a vehicle, the automatic transmission having an engagement element and an actuator disposed between a torque input and a torque output, the engagement element operative in engagement states to selectively transfer torque from the torque input to the torque output and wherein the actuator applies a pressure to the engagement element to control the engagement state of the engagement element, said method comprising:
   sensing a vehicle stop condition;
   reducing the pressure applied by the actuator to the engagement element to a neutral idle pressure in response to said vehicle stop condition;
   sensing said neutral idle pressure; and
   stopping the vehicle engine after sensing said neutral idle pressure.

2. The method of claim 1 wherein the engagement element is a clutch pack and the actuator is a hydraulic clutch assembly and wherein said step of sensing said neutral idle pressure further includes the step of sensing a neutral idle hydraulic pressure within the clutch assembly wherein the clutch pack is in a disengaged state in response to said neutral idle hydraulic pressure.

3. The method of claim 1 further comprising the steps of:
   sensing a vehicle start condition; and
   increasing the pressure applied by the actuator to the engagement element in response to said vehicle start condition.

4. The method of claim 3 wherein said step of increasing the pressure applied by the actuator further comprises the steps of:
   starting the engine in response to said vehicle start condition;
   increasing the pressure applied to the engagement element while starting the engine in response to said vehicle start condition; and
   increasing the pressure applied to the engagement element as a function of engine throttle after the engine is started.

5. The method of claim 4 wherein the engagement element enters an engaged state as a result of increasing the pressure as a function of engine throttle.

6. The method of claim 4 wherein the engagement element enters a pre-engaged state as a result of increasing the pressure while starting the engine.

7. The method of claim 1 comprising:
   sensing an engine start condition;
   starting the engine in response to said engine start condition while maintaining said neutral idle pressure.

8. The method of claim 7 comprising;
   sensing an engine stop condition after starting the engine in response to said engine start condition; and
   stopping the engine in response to said engine stop condition while maintaining said neutral idle pressure.

9. The method of claim 7 comprising:
   sensing a vehicle start condition after starting the engine in response to said engine start condition; and
   increasing the pressure applied to the engagement element as a function of throttle in response to said vehicle start condition.

10. A method of controlling an engine and an automatic transmission in a vehicle, the automatic transmission having an engagement element and an actuator disposed between a torque input and a torque output, the engagement element operative in engagement states to selectively transfer torque from the torque input to the torque output and wherein the actuator applies a pressure to the engagement element to control the engagement state of the engagement element, said method comprising:
    stopping the engine after the engagement element is in a disengaged state;
    sensing an engine start condition after stopping the engine;
    starting the engine in response to said engine start condition while maintaining the engagement element in said disengaged state; and
    maintaining the engagement element in said disengaged state while the engine is running.

11. The method of claim 10 further comprising:
    sensing a vehicle stop condition;
    placing the engagement element in said disengaged state in response to said vehicle stop condition; and
    sensing when the engagement element enters a disengaged state before stopping the engine while the engagement element is in said disengaged state.

12. The method of claim 10 further comprising:
    sensing a vehicle start condition; and
    placing the engagement element in an engaged state as a function of throttle in response to said vehicle start condition.

13. The method of claim 10 comprising:
    sensing an engine stop condition;
    stopping the engine in response to said engine stop condition;
    sensing a vehicle start condition after stopping the engine;
    increasing pressure applied by the actuator to the engagement element while starting the engine in response to said vehicle start condition, wherein the engagement element enters a pre-engagement state as a result of increasing pressure during starting the engine; and
    increasing pressure applied by the actuator to the engagement element as a function of throttle, wherein the engagement element enters an engaged state as a result of increasing pressure as a function of throttle.

14. A method of controlling an engine and an automatic transmission in a vehicle, the automatic transmission having an engagement element and an actuator disposed between a torque input and a torque output, the engagement element operative in engagement states to selectively transfer torque from the torque input to the torque output and wherein the actuator applies a pressure to the engagement element to control the engagement state of the engagement element, said method comprising:

sensing a vehicle stop condition;

reducing the pressure applied by the actuator to the engagement element in response to said vehicle stop condition to a neutral idle pressure;

sensing said neutral idle pressure;

stopping the vehicle engine after sensing the neutral idle pressure;

sensing a vehicle start condition;

starting the engine in response to said vehicle start condition;

increasing the pressure applied to the engagement element while starting the engine in response to said vehicle start condition; and increasing the pressure as a function of engine throttle after the engine is started.

15. The method of claim 14 comprising:

sensing an engine start condition;

starting the engine in response to said engine start condition while maintaining said neutral idle pressure.

16. The method of claim 15 comprising:

sensing an engine stop condition after starting the engine in response to said engine start condition; and stopping the engine in response to said engine stop condition while maintaining said neutral idle pressure.

* * * * *

UNITED STATES PATENT AND TRADEMARK OFFICE
CERTIFICATE OF CORRECTION

PATENT NO. : 6,926,639 B2
DATED : August 9, 2005
INVENTOR(S) : Mark L. Hopper

It is certified that error appears in the above-identified patent and that said Letters Patent is hereby corrected as shown below:

Title page,
Item [56], References Cited, U.S. PATENT DOCUMENTS,
"6,169,606 B1      1/2001      Kimura et al." should be
-- 6,196,806 B1      3/2001      Van Der Sluis --.
OTHER PUBLICATIONS,
"U.S. Patent Aplication Publication No. US 2001/0010027 A1, published Jul. 26, 2001, entitled "Hybrid Vehicle Control Device," to Takano et al." should be
-- U.S. Patent Application Publication No. US 2001/0010027 A1, published Jul. 26, 2001, entitled "Hybrid Vehicle Control Device," to Takano et al. --.

"U.S. Patent Aplication Publication No. US 2001/0024994 A1, published Sep. 27, 2001, entitled "Transmission Unit," to Sugano." should be
-- U.S. Patent Application Publication No. US 2001/0024994 A1, published Sep. 27, 2001, entitled "Transmission Unit," to Sugano. --.

"U.S. Patent Aplication Publication No. US 2002/0019691 A1, published Feb. 14, 2002, entitled "Automatic Start Controlling Apparatus Of Internal Combustion Engine And Detector For Detecting Engagement Of Clutch," to Matsubara et al." should be
-- U.S. Patent Application Publication No. US 2002/0019691 A1, published Feb. 14, 2002, entitled "Automatic Start Controlling Apparatus Of Internal Combustion Engine And Detector For Detecting Engagement Of Clutch," to Matsubara et al. --.

"U.S. Patent Aplication Publication No. US 2002/0074173 A1, published Jun. 20, 2002, entitled "Automatic Stop/Start-Up Controlling Device Of An Engine," to Morimoto et al." should be
-- U.S. Patent Application Publication No. US 2002/0074173 A1, published Jun. 20, 2002, entitled "Automatic Stop/Start-Up Controlling Device Of An Engine," to Morimoto et al. --.

"U.S. Patent Aplication Publication No. US 2002/000193930 A1, published Dec. 19, 2002, entitled "Automatic Engine Stop/Restart-Type Vehicle, Method Of Controlling The Same, And Automatic Engine Stop Apparatus," to Matsubara at al." should be
-- U.S. Patent Application Publication No. US 2002/0193930 A1, published Dec. 19, 2002, entitled "Automatic Engine Stop/Restart-Type Vehicle, Method Of Controlling The Same, And Automatic Engine Stop Apparatus," to Matsubara et al. --.

UNITED STATES PATENT AND TRADEMARK OFFICE
CERTIFICATE OF CORRECTION

PATENT NO. : 6,926,639 B2
DATED : August 9, 2005
INVENTOR(S) : Mark L. Hopper

It is certified that error appears in the above-identified patent and that said Letters Patent is hereby corrected as shown below:

Title page (cont'd),
"U.S. Patent Aplication Publication No. US 2003/0022757 A1. published Jan. 30, 2002, entitled "Engine Restart Starting Control System For Transmission," to Shimabukuro et al." should be
-- U.S. Patent Application Publication No. US 2003/0022757 A1, published Jan. 30, 2003, entitled "Engine Restart Starting Control System For Transmission," to Shimabukuro et al. --.

"U.S. Patent Aplication Publication No. US 2003/0045988 A1, published Mar. 6, 2002, entitled "Control Apparatus And Method For Vehicle Having An Idle Stop Function," to Suzuki et al." should be
-- U.S. Patent Application Publication No. US 2003/0045988 A1, published Mar. 6, 2003, entitled "Control Apparatus And Method For Vehicle Having An Idle Stop Function," to Suzuki et al. --.

Signed and Sealed this

Eleventh Day of October, 2005

JON W. DUDAS
*Director of the United States Patent and Trademark Office*

UNITED STATES PATENT AND TRADEMARK OFFICE
CERTIFICATE OF CORRECTION

PATENT NO. : 6,926,639 B2
DATED : August 9, 2005
INVENTOR(S) : Mark L. Hopper

It is certified that error appears in the above-identified patent and that said Letters Patent is hereby corrected as shown below:

Title page,
Item [56], References Cited, U.S. PATENT DOCUMENTS,
"6,169,806 B1    1/2001    Kimura et al." should be
-- 6,196,806 B1    3/2001    Van Der Sluis --.
OTHER PUBLICATIONS,
"U.S. Patent Aplication Publication No. US 2001/0010027 A1, published Jul. 26, 2001, entitled "Hybrid Vehicle Control Device," to Takano et al." should be
-- U.S. Patent Application Publication No. US 2001/0010027 A1, published Jul. 26, 2001, entitled "Hybrid Vehicle Control Device," to Takano et al. --.

"U.S. Patent Aplication Publication No. US 2001/0024994 A1, published Sep. 27, 2001, entitled "Transmission Unit," to Sugano." should be
-- U.S. Patent Application Publication No. US 2001/0024994 A1, published Sep. 27, 2001, entitled "Transmission Unit," to Sugano. --.

"U.S. Patent Aplication Publication No. US 2002/0019691 A1, published Feb. 14, 2002, entitled "Automatic Start Controlling Apparatus Of Internal Combustion Engine And Detector For Detecting Engagement Of Clutch," to Matsubara et al." should be
-- U.S. Patent Application Publication No. US 2002/0019691 A1, published Feb. 14, 2002, entitled "Automatic Start Controlling Apparatus Of Internal Combustion Engine And Detector For Detecting Engagement Of Clutch," to Matsubara et al. --.

"U.S. Patent Aplication Publication No. US 2002/0074173 A1, published Jun. 20, 2002, entitled "Automatic Stop/Start-Up Controlling Device Of An Engine," to Morimoto et al." should be
-- U.S. Patent Application Publication No. US 2002/0074173 A1, published Jun. 20, 2002, entitled "Automatic Stop/Start-Up Controlling Device Of An Engine," to Morimoto et al. --.

"U.S. Patent Aplication Publication No. US 2002/000193930 A1, published Dec. 19, 2002, entitled "Automatic Engine Stop/Restart-Type Vehicle, Method Of Controlling The Same, And Automatic Engine Stop Apparatus," to Matsubara at al." should be
-- U.S. Patent Application Publication No. US 2002/0193930 A1, published Dec. 19, 2002, entitled "Automatic Engine Stop/Restart-Type Vehicle, Method Of Controlling The Same, And Automatic Engine Stop Apparatus," to Matsubara et al. --.

UNITED STATES PATENT AND TRADEMARK OFFICE
CERTIFICATE OF CORRECTION

PATENT NO. : 6,926,639 B2
DATED : August 9, 2005
INVENTOR(S) : Mark L. Hopper

It is certified that error appears in the above-identified patent and that said Letters Patent is hereby corrected as shown below:

Title page (cont'd),
"U.S. Patent Aplication Publication No. US 2003/0022757 A1. published Jan. 30, 2002, entitled "Engine Restart Starting Control System For Transmission," to Shimabukuro et al." should be
-- U.S. Patent Application Publication No. US 2003/0022757 A1, published Jan. 30, 2003, entitled "Engine Restart Starting Control System For Transmission," to Shimabukuro et al. --.

"U.S. Patent Aplication Publication No. US 2003/0045988 A1, published Mar. 6, 2002, entitled "Control Apparatus And Method For Vehicle Having An Idle Stop Function," to Suzuki et al." should be
-- U.S. Patent Application Publication No. US 2003/0045988 A1, published Mar. 6, 2003, entitled "Control Apparatus And Method For Vehicle Having An Idle Stop Function," to Suzuki et al. --.

This certificate supersedes Certificate of Correction issued October 11, 2005.

Signed and Sealed this

Tenth Day of January, 2006

JON W. DUDAS
*Director of the United States Patent and Trademark Office*